United States Patent Office 2,970,120
Patented Jan. 31, 1961

2,970,120
FOAMED CARBAMIDE RESINS AND METHOD OF PREPARING SAME

Werner H. Kreidl, New York, N.Y., and Otto Vieli, Razuns, Switzerland, assignors to Vereinigte Chemische Fabriken Kreidl, Rutter & Co., Vienna, Austria, and Spumalit-Anstalt, Vaduz, Liechtenstein No Drawing. Filed June 3, 1958, Ser. No. 739,481
Claims priority, application Austria June 3, 1957
7 Claims. (Cl. 260—2.5)

It is well known to produce foamed plastics, which are also referred to as expanded plastics, by mixing and agitating aqueous synthetic resins, such as carbamide resins, to produce an aqueous foam these being produced by means of suitable mechanical devices. These synthetic aqueous foamed resins are then transformed into the hardened, insoluble and unfusible condition by the action of catalysts and, if required, heat. With these known processes, cured foamed resins having specific weights of about 10 kg. per cubic meter or more can be produced. These foams prepared from carbamide resins are brittle, non-resilient and are not moldable under the influence of heat.

While commercial carbamide resins are suitable for the production of brittle foamed resins having a specific weight of more than 10 kg. per cubic meter, but it is not possible to prepare foamed resins having specific weights of less than 10 kg. per cubic meter from these commercial resins.

The present invention relates to a process of producing foamed resins of the urea-formaldehyde group of low specific weight, less than 10 kg. per cubic meter and the invention has as its objective the production of urea-formaldehyde foamed resins which have considerably lower specific weights than the known foamed resins of this same general type.

It was found that carbamide resins are suited for the production of such light-weight foamed resins only if they show the following properties:

(1) The carbamide resins must be dilutable with water and dilute acids, which latter are used for the hardening process, within a wide range of dilution ratios. This dilutability must be present during a prolonged foaming and curing action, especially during the hardening process, since the separation of the resin from the aqueous system in a flocculent state would result in an undesirable breakdown of the foamed material.

(2) The carbamide resins must be compatible with the conventional foaming agents which are used in the usual concentrations, e.g. with sulfonates, without precipitation or coagulation.

(3) The carbamide resins must completely envelop the lamellae of the aqueous foam when being mixed with the latter, and no enlargement of the lamellae by merging should occur.

(4) The carbamide resins must further stay fixed on the individual lamellae of the foam. They should not penetrate through the foam, but rather retain the shape of the lamellae of the aqueous foam and be subjected while in this shape to the conventional hardening process.

(5) The carbamide resins must have an exactly adjusted reactivity and gelling time, which both depend upon the temperature of working and the desired moldability of the foam, in order that the foam does not collapse due to its own weight when the hardening process is carried out slowly, nor that the foam becomes unmoldable when a high hardening rate is applied. This adjustment of the gelling time may be accomplished by applying the usual or conventional measures, e.g. by adding ammonia, formaldehyde or buffer substances to the resin so produced, or by varying the concentration of the hardening agent or the working temperature.

The invention essentially resides in that basic groups, preferably amino-groups, are introduced into the urea-formaldehyde molecule by adding substances containing basic groups or amino-groups, e.g. ammonia, triethanolamine or melamine, to the aqueous urea-formaldehyde solution prior to the foaming, in quantities of from 0.002 to 0.2 mole per mole of urea.

In this manner it is possible to produce foamed resins having specific weights considerably below 10 kg. per cubic meter. In general, the foamed resins produced according to the invention have specific weights of from 4 to 6 kg. per cubic meter. In case the process is carried out in a continuous manner, it is even possible to produce foamed resins having a specific weight of as low as 2.5 kg. per cubic meter. Due to the low resin content these foamed resins can be produced very economically, and beyond that they show new and surprising properties of moldability under heat. In spite of the hardened condition of the resin skeleton the cured expanded resin mass is extremely resilient and is moldable by reason of this resilience under the influence of heat.

In the paper and textile industries the addition of substances containing basic groups to urea-formaldehyde condensation product is known, e.g. for impregnating paper and textiles in order to increase the affinity of the impregnating agent to the paper or textile fibers. Furthermore, it is known to add such substances to urea-formaldehyde condensation products in order to increase the bonding qualities of lacquers and varnishes. However, the quantities of the amines or aminoalcohols added for these purposes are so different from the quantities required for the process according to the invention and the results are so completely different that such resins are not suitable for the production of light-weight foamed resins which are achieved by the present invention.

Suitably the process according to the invention is carried out in such a manner that the substances containing the basic groups are added in such quantities that the resin, when being diluted with an aqueous solution containing the foaming agent and an acid hardening agent and when being hardened, does not separate in a flocculent state.

The quantity of the substances containing basic groups required and the limits of which must not be exceeded in either direction in order to obtain foamed resins having the properties specified above each depends materially upon the individual substances which are used. Ammonia is added in quantities of from 0.02 to 0.2, preferably 0.1 mole per mole of urea. The quantities of triethanolamine added to the urea-formaldehyde resin solution are between 0.005 and 0.2, preferably 0.01 mole per mole of urea. When melamine is used it is added in quantities of from 0.002 to 0.5, preferably 0.01 mole per mole of urea.

Salts or esters of sulfonic acids, preferably alkylsulfonates, are advantageously used as foaming agents. The ratio of urea to formaldehyde may be 1 mole urea: 1.5 to 2.5 moles formaldehyde. Although the degree of condensation may be varied within wide limits, it was found that it is favourable to keep the degree of condensation as high as possible provided that the required dilutability is still given.

*Example 1*

60 g. of urea, 165 g. of formaldehyde (36% solution) and 1.26 g. of melamine are mixed and heated after the addition of 1 cm.³ of a 4-n sodium hydroxide solution.

The originally turbid mixture becomes clear at 30° centigrade, and at 95° centigrade it reacts slightly exothermally. After the start of the reaction at 95° centigrade the mixture is refluxed for 10 minutes whereupon the pH is adjusted to 4.5–4.7 by adding 4-n formic acid, and boiling is continued for an additional 30 minutes. The resulting product is then neutralized by adding sodium hydroxide solution and is allowed to cool. The solution of the carbamide resin has a resin content of about 44% and a viscosity of from 45 to 55 centistokes.

5 g. of this carbamide resin are diluted with 2 cm.³ of water. In this diluted solution 0.1 g. of thiourea are dissolved and the solution is heated to 30° centigrade.

Under rapid stirring and while blowing air into the solution, the carbamide resin solution is mixed with a solution of 0.2 g. of an alkylsulfonate in 10 cm.³ of n/10 sulfuric acid whereby the aqueous resin solution forms a stiff foam. As soon as the mixing is completed the stiff foam is cast into molds where it is allowed to harden at room temperature. The hardening and dry process may be accelerated by gentle heating. The dried foam may be further hardened at temperatures of between 100 and 110° centigrade.

Example 2

60 g. of urea, 185 g. of formaldehyde (36% solution) and 7 g. of ammonia (24% solution) are heated at reflux conditions to boiling temperature. After 20 minutes of refluxing the pH is checked, and as required, is adjusted to pH 4.5–5.0 by adding dilute hydrochloric acid or sodium hydroxide. After a further period of 20 minutes the solution is neutralized by adding sodium hydroxide solution, and allowed to cool. The solution of the carbamide resin thus obtained has a resin content of about 44% and shows a viscosity of from 40–80 centistokes. The resin thus obtained is mixed with air and foaming stabilizing material to make a foam as set forth in Example 1 and this foam is further processed according to Example 1.

Example 3

60 g. of urea, 175 g. of formaldehyde (36%) and 1.5 g. of triethanolamine are refluxed. After 30 minutes of boiling the pH of the solution is adjusted to 4.0–4.5 boiling is continued for another 5 minutes and the solution is then cooled to 60° centigrade. The solution is held at this temperature until a cooled sample shows a viscosity of at least 35 centistokes. The solution is then neutralized by adding sodium hydroxide solution and allowed to cool. The resin thus obtained is foamed and further processed as specified in Example 1.

The foamed resins obtained according to Examples 1–3 show specific weights of from about 4–6 kg. per cubic meter. Foamed resins of even lower specific weights are obtained by a continuous process.

Urea-formaldehyde resins which are produced according to the following Examples 4 and 5 are suitable for producing foams for a specific weight greater than 4–6 kg. per cubic meter and the products thus obtained are not suited for the production of foamed resins of extremely light weight since the aqueous foamed cells tend to collapse.

Example 4

60 g. of urea, 162 g. of formaldehyde (36% and 0.2 g. of melamine are mixed. The mixture is further processed according to Example 1. After 60 to 80 minutes of boiling at a pH of 4.5 to 4.7 a viscosity of 45 to 55 centistokes is also obtained.

Example 5

60 g. of urea, 180 g. of formaldehyde (36%) and 7 g. of melamine are processed according to Example 1. After 30 to 40 minutes of boiling at a pH of 4.5 to 4.7 a viscosity of 45 to 55 centistokes is also obtained.

The foamed resins obtained according to Example 1 to 3 show such high stability that it is possible to mix with them prior to or during the hardening process fibrous or non-fibrous fillers, e.g. wood-flour, asbestos, cement or the like.

In order to improve the chemical stability, especially the damp-proofing qualities at elevated temperatures, the foamed resins according to the invention may be mixed with aqueous solutions of melamine resins or phenolic resins without losing their ability of being foamed. In contrast, it is not possible to add to commerical carbamide resins these qualities of melamine resins or phenolic resins because the resulting mixtures cannot be foamed to produce resins having low specific weights as are provided in accordance with the present invention.

What we claim is:

1. A process for preparing a resilient and moldable foamed mass of urea-formaldehyde resin having a specific weight of less than 10 kilograms per cubic meter comprising: foaming by blowing air into an aqueous resin product which is prepared by condensing in a first stage of reaction in an alkaline aqueous medium urea, formaldehyde and a basic substance selected from the group consisting of ammonia, triethanolamine and melamine, the ratio of urea to formaldehyde being between 1 mol of urea to 1.5–2.5 mols of formaldehyde, there being present from 0.002 to 0.2 mol of said basic substance per mol of urea, and by completing the condensation in a second stage of reaction with the aqueous medium adjusted to pH of 4–5 whereafter the mixture is neutralized; casting said foamed aqueous product and hardening said product.

2. A process as claimed in claim 1 wherein an acid is added after neutralizing said mixture to accelerate hardening of said resin.

3. A process as claimed in claim 1 wherein said basic substance is ammonia and wherein said ammonia is added in a quantity of 0.1 mol per mol of urea.

4. A process as claimed in claim 1 wherein said basic substance is triethanolamine which is added in an amount of 0.001 mol per mol of urea.

5. A process as claimed in claim 1 wherein said basic substance is melamine in an amount of 0.001 mol per mol of urea.

6. A process as claimed in claim 3 wherein the resin content of the aqueous mixture after said second stage of condensation is about 44% and the viscosity of said mixture is from 40–80 centistokes.

7. The foamed product made by the process of claim 1.

References Cited in the file of this patent

UNITED STATES PATENTS

| | | |
|---|---|---|
| 2,306,697 | Hayward | Dec. 29, 1942 |
| 2,485,080 | Wohnsiedler et al. | Oct. 18, 1949 |
| 2,559,891 | Meyer | July 10, 1951 |